United States Patent [19]
Tao

[11] Patent Number: 5,612,605
[45] Date of Patent: Mar. 18, 1997

[54] AUTO BOOST FOR VOLTAGE/FREQUENCY MOTOR CONTROLLER

[75] Inventor: Jinghan Tao, Shorewood, Wis.

[73] Assignee: Allen-Bradley Company, Inc., Milwaukee, Wis.

[21] Appl. No.: 560,127

[22] Filed: Nov. 17, 1995

Related U.S. Application Data

[63] Continuation-in-part of Ser. No. 532,134, Sep. 22, 1995, abandoned.

[51] Int. Cl.$^6$ .................................. H02M 1/12; H02P 1/42
[52] U.S. Cl. ........................ 318/805; 314/802; 314/808; 314/138
[58] Field of Search ........................ 318/800–832, 318/138, 254, 139; 363/40, 71, 98; 323/259, 344, 207

[56] References Cited

U.S. PATENT DOCUMENTS

| | | | |
|---|---|---|---|
| 4,297,625 | 10/1981 | Newell | 318/696 |
| 4,538,100 | 8/1985 | Tuten et al. | 318/808 |
| 4,549,122 | 10/1985 | Berkopec et al. | 318/328 |
| 4,893,479 | 1/1990 | Gillett et al. | 62/213 |
| 5,010,287 | 4/1991 | Mukai et al. | 318/801 |
| 5,123,080 | 6/1992 | Gillett et al. | 388/934 |
| 5,272,428 | 12/1993 | Spiegel et al. | 318/803 |
| 5,319,535 | 6/1994 | Brennen | 363/40 |
| 5,325,042 | 6/1994 | Murugan | 322/10 |
| 5,349,517 | 9/1994 | Brennen | 363/40 |
| 5,355,295 | 10/1994 | Brennen | 363/40 |
| 5,440,219 | 8/1995 | Wilkerson | 318/802 |

*Primary Examiner*—Paul Ip
*Attorney, Agent, or Firm*—Michael A. Jaskolski; John M. Miller; John J. Horn

[57] ABSTRACT

A method and/or apparatus used with a voltage/frequency driver for controlling a motor that maintains a motor driving magnetizing flux at low frequencies and maintains a constant desired motor speed despite relatively high slip at low frequencies. The voltage/frequency driver controls both magnetizing flux and motor speed without requiring sensing or calculating hardware in addition to hardware typically included with a voltage/frequency driver.

22 Claims, 4 Drawing Sheets

AUTO BOOST FOR VOLTAGE/FREQUENCY MOTOR CONTROLLER

CROSS REFERENCE

This application is a continuation-in-part of application Ser. No. 08/532,134, filed on Sep. 22, 1995, now abandoned.

FIELD OF THE INVENTION

The present invention relates to AC motors and more particularly to an apparatus and method to be used with a voltage/frequency controller to provide an automatic voltage boost at low frequencies in order to maintain magnetizing motor flux in a desired range.

DESCRIPTION OF THE ART

Many motor applications require that the motor be driven at various speeds. Motor speed can be adjusted with an adjustable speed drive (ASD) which is placed between a voltage source and an associated motor that can excite the motor at various driver frequencies.

One commonly used type of ASD uses a pulse width modulated (PWM) invertor and associated PWM controller which can control both the magnitude $V_s$ and frequency $f_s$ of a stator voltage provided across stator windings of a motor. The stator voltage $V_s$ provides a stator winding current $I_s$ that lags the voltage $V_s$ by a phase angle θ.

Figure 2:
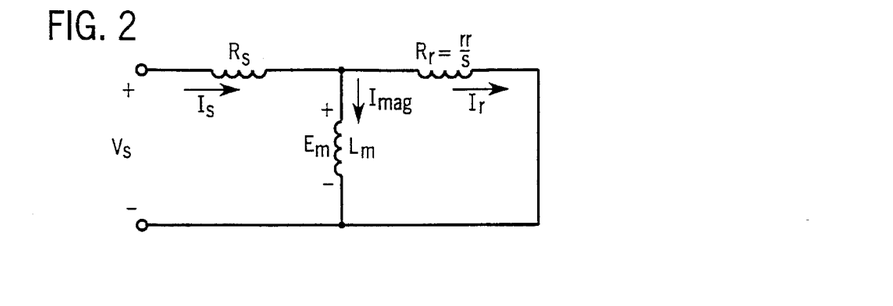
FIG. 2 is a schematic of an equivalent circuit for a single phase of a three phase motor.

Referring to FIG. 2, a simplified equivalent circuit for a single phase of a three phase motor includes a stator resistance $R_s$ in series with the parallel combination of a rotor resistance $R_r$ and a magnetizing inductance $L_m$. The rotor resistance $R_r$ is equal to real resistance $r_r$ divided by slip s. Stator current $I_s$ splits between the magnetizing inductance $L_m$ and the rotor resistance $R_r$ in a manner dependent on the stator voltage frequency $f_s$ and a slip s associated with a specific motor load. The magnetizing current $I_{mag}$ flowing through the inductor $L_m$ in turn generates a magnetizing flux $\Phi_m$ between the stator and the rotor which effects rotation of the rotor as well known in the art.

When a multiphase induction motor is fed by a variable frequency multiphase supply such as a PWM invertor it is desirable to insure that a magnetizing flux $\Phi_m$ maintains and keeps, for given operating conditions, a magnitude within a preferred range. In particular, it is often desirable to maintain the magnetizing flux level close to its rated value as the motor operating conditions (i.e. motor speed and the torque) vary. The rated flux level is the flux level attained when the motor operates at a rated frequency with rated voltage and zero load. By maintaining a constant magnetizing flux near the rated value a drive can generate the highest possible torque per amp of stator current and therefore results in the best possible utilization of the available current capability of the drive.

Unfortunately, the magnetizing flux $\Phi_m$ varies considerably at different voltages and frequencies and as a function of motor load. In addition, as winding temperature changes the resistive values in FIG. 2 typically change by as much as 20% which can affect the magnitude of magnetizing current and thus the amount of magnetizing flux.

Referring still to FIG. 2, a reactance $X_m$ associated with the magnetizing inductance $L_m$ can be expressed as:

$$X_m = 2\pi f_s L_m \quad (1)$$

where $f_s$ is the frequency of the stator voltage $V_s$. Equation 1 indicates that the reactance $X_m$ is small at low frequencies. When the reactance $X_m$ is small, the magnetizing potential $E_m$ across the inductor $L_m$ is reduced, this reduction being reflected in an increased potential drop across the stator resistor $R_s$. Because magnetizing flux $\Phi_m$ reflects magnetizing potential $E_m$, as potential $E_m$ decreases, so does the flux $\Phi_m$. Less flux $\Phi_m$ leads to severe under excitation and intolerable loss of torque capability at low frequencies. In many instances resulting torque loss at low frequencies makes it near impossible to start a motor.

PWM drivers incorporating vector control circuitry provide one solution to the low frequency magnetizing flux problem. These circuits derive accurate magnetizing and torque producing current feedback vectors and adjust stator voltage $V_s$ and frequency $f_s$ as a function of the feedback vectors to maintain the magnetizing flux $\Phi_m$ in the desired range. While vector control drives function well, they require hardware to monitor many different operating parameters and complex circuitry to calculate and provide required feedback signals to enable precise vector control. For this reason, vector control drives are typically expensive and, for some applications, are prohibitively expensive.

Another less expensive type of drive is a voltage/frequency (V/F) drive. V/F drives, like the vector control drives, are capable of altering both stator winding voltage $V_s$ and frequency $f_s$ to adjust magnetizing flux. However, to minimize costs, these drives typically do not include additional sensing hardware or circuitry required to provide a magnetizing current feedback vector for use in controlling the magnetizing flux. Instead, V/F drives are typically programmed to maintain voltage-frequency relationships which are known to provide sufficient magnetizing flux for motor operation at most frequencies. For example, to optimally drive a motor at a rated frequency $f_{rate}$, the magnitude of the stator voltage should be equal to a rated or name-plate voltage $V_{rate}$ when the motor is driven with no load. The rated voltage $V_{rate}$ is calculated to provide the rated flux level (i.e. the optimal flux load). Similarly, for most frequencies, optimal motor operation results when:

$$\frac{V_{rate}}{V_s} = \frac{f_{rate}}{f_s} \quad (2)$$

where $f_s$ is a frequency less than $f_{rate}$ and $V_s$ corresponds to the frequency $f_s$. Hence, most V/F drives simply maintain the relationships expressed in Equation 2. Unfortunately, at low frequencies, even where the relationships expressed in Equation 2 are maintained, the magnetizing flux $\Phi_m$ is insufficient to drive a motor.

One technique used with V/F drives to drive a motor at low frequencies is to provide a stator voltage boost $V_b$ at low frequencies. The boost $V_b$ increases the stator voltage $V_s$ and hence both the magnetizing potential $E_m$ and the associated magnetizing flux $\Phi_m$. If the increased flux $\Phi_m$ is sufficient the motor will operate.

Unfortunately, the magnitude of a voltage boost $V_b$ required to increase the magnetizing flux to an effective range is not readily apparent. Where the boost magnitude is too small, the boost will be ineffective and torque will not be able to sustain motor operation. In this case, the user must increase the boost voltage $V_b$ manually and try to start the motor again. Where the boost magnitude is too large, the motor can be overexcited and stator and rotor iron can be heavily saturated. With saturation, heating problems can develop which can damage motor components and reduce their useful life. Thus, the boost magnitude is typically increased only minimally during successive starting attempts until the proper boost level is attained. This protocol is time consuming and not very exact.

Moreover, where the proper boost level for a specific load is attained through iterative boost changes, the fixed boost level will not be suitable when the motor load is changed. For example, if the magnitude of the boost is set during a full load condition, at no load, the boost will likely be much too large for driving purposes. The excessive boost will cause excessive stator currents and saturate the motor iron. There is no good way to change the boost manually when the motor is continuously running and therefore, as load changes, conventional methods are insufficient.

Other solutions used with a V/F drive include providing additional hardware and computing capability. However, for many applications, as with vector control drives, this solution is cost prohibitive.

Another problem with V/F drives is that at low frequencies motor operation is characterized by an increase in slip. Thus, where a stator voltage frequency $f_s$ is provided which should drive the motor at a desired speed $RPM_d$, because of increased slip at low frequencies, the actual motor speed $RPM_a$ is less than desired.

Thus, it would be advantageous to have a method and/or apparatus to be used with a V/F drive that could maintain a magnetizing flux level that drives a motor at low operating frequencies despite an increased relative magnitude of the stator resistive drop without requiring additional sensors or complex calculating circuitry. In addition, it would be advantageous if the V/F drive could also adjust driving frequency to precisely match actual motor speed to a desired motor speed using sensors and calculating hardware already provided in most V/F drives.

SUMMARY OF THE INVENTION

The present invention includes both a method and an apparatus for automatically providing a voltage boost via a V/F driver to a motor operating at low frequency in order to maintain magnetizing flux $\Phi_m$ within an effective motor driving range. The magnetizing flux $\Phi_m$ is proportional to the magnetizing current $I_{mag}$ and thus, by controlling the current $I_{mag}$ the flux $\Phi_m$ can also be controlled. The magnetizing current $I_{mag}$ can be increased by increasing the stator voltage $V_s$ and decreased by decreasing $V_s$.

Typical V/F drives are equipped with a stator current sensor for sensing stator current $I_s$. Because the V/F drive provides the stator voltage $V_s$, the phase angle θ between the stator voltage $V_s$ and current $I_s$ can be determined. As explained in more detail below, the magnetizing current $I_{mag}$ is related to the stator current $I_s$ according to the equation:

$$I_{mag} \approx I_s \sin \theta \quad (3)$$

A close approximation of the magnetizing current $I_{mag}$ can be determined using Equation 3. The approximate magnetizing current $I_{mag}$ can be compared to a desired magnetizing current corresponding to the desired magnetizing flux $\Phi_m$ and the stator voltage $V_s$ can be altered accordingly to maintain the flux $\Phi_m$ in the desired range.

Thus, one object of the present invention is to provide a simple means by which a magnetizing current approximation can be determined which can then be compared to a desired magnetizing current, the result of the comparison used to adjust actual magnetizing current and hence to maintain magnetizing flux $\Phi_m$ in a range sufficient to drive the motor.

Another object is to provide magnetizing flux compensation using a V/F drive at low frequencies using hardware already provided on most V/F drives. V/F drives already include a stator current sensor and the phase angle θ can easily be calculated by comparing the stator current $I_s$ and stator voltage $V_s$, which is known because it is supplied by the drive. Thus, all the information required in Equation 3 is readily attainable.

The present invention also provides frequency compensation to alter the stator voltage frequency as a function of the stator current $I_s$. At low frequencies, motor slip is increased and therefore, driving frequency must be adjusted in order to attain a desired motor speed. An equation has been derived which relates rated motor parameters and the sensed stator current to a frequency modifier value which can compensate for speed loss due to slip.

Thus, another object is to provide frequency compensation at low frequencies using information readily available to V/F drives and using hardware already existing in V/F drives. The present method requires only a single calculation using the sensed stator current value and known rated motor values.

Other and further aspects of the present invention will become apparent from the description that follows and by reference to the accompanying drawings.

DETAILED DESCRIPTION OF THE PREFERRED EMBODIMENT

For the purposes of understanding the principles of the present invention, reference will now be made to the embodiments illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

The present invention will be described in the context of the exemplary PWM invertor 10 shown in FIG. 1. The invertor 10 is shown connected to a voltage/frequency V/F driver 11, a DC voltage source 18, and a motor 19. A V/F booster 20 is connected to and communicates with the V/F driver 11. Note that while the boost 20 is shown as a separate component, it is contemplated that the boost 20 could be implemented within the driver 11 and therefore, the boost 20 need not be a separate component. The invertor consists of six solid state switching devices 12–17 (BJT, GTO, IGBT or other transistor technology devices may be used) arranged in series pairs, each switching device 12–17 being coupled with an inverse parallel connected diode 23–29.

Each series arranged pair of switching devices 12 and 13, 14 and 15, and 16 and 17, make up a separate leg 39, 40 or 41 of the invertor 10 and have a common node which is electrically connected to a unique motor terminal 30, 31, or 32 (and thus to a unique stator winding 35, 36, or 37). Each switching device 12–17 is also electrically connected by a firing line 51–56 to the V/F driver 11 and indirectly through the driver to a voltage boost module 20. A split DC voltage source 18 creates a high voltage rail 48 and a low voltage rail 49 and each leg 39, 40, 41 connects the high voltage rail 48 to the low voltage rail 49.

To avoid repetitive disclosure, the PWM invertor 10 will be explained by referring only to leg 39 as all three legs 39, 40, and 41 of the invertor operate in the same manner.

The V/F driver 11 operates to turn the switching devices 12, 13 of leg 39 ON and OFF in a repetitive sequence that alternately connects the high and low voltage rails 48, 49 to, and produces a series of high frequency voltage pulses at, terminal 31. The high frequency voltage pulses average over a given period to produce a low frequency alternating stator voltage $V_s$ at terminal 31.

Figure 4:
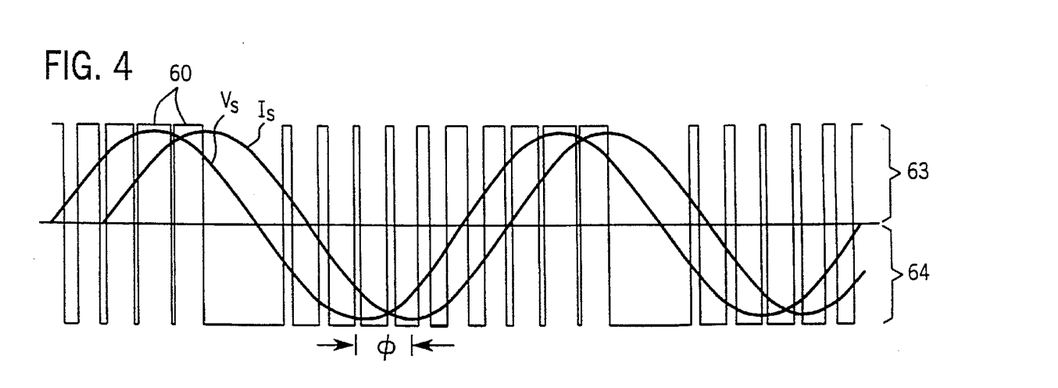
FIG. 4 is a graph illustrating stator winding voltage and current signals generated by the PWM invertor of FIG. 1.

Referring to FIG. 4, an exemplary sequence of high frequency pulses 60 that an invertor 10 might provide to motor terminal 31 can be observed along with an exemplary low frequency alternating stator voltage $V_s$. By varying the widths of the positive portions 63 of each high frequency pulse relative to the widths of the negative portions 64 over a series of pulses 60, a changing average voltage value which alternates sinusoidally can be generated. The changing average value defines the low frequency alternating stator voltage $V_s$ that drives the motor 19. The stator winding voltage $V_s$ produces a stator winding current $I_s$ that lags the stator voltage $V_s$ by a phase angle θ.

Referring to FIGS. 2 and 4, when the voltage $V_s$ is supplied across the stator phase, there is a stator resistive voltage drop across stator resistor $R_s$ and an inductive potential drop $E_m$ across the inductor $L_m$ and the rotor resistor $R_r$ in parallel. The inductive potential magnitude and resulting current $I_{mag}$ are proportional to the magnetizing flux $\Phi_m$ which must be maintained within a desired range in order to drive a motor. At low frequencies, the ratio of stator resistance drop $R_s I_s$ to magnetizing potential $E_m$ increases to the point where the magnetizing potential $E_m$ cannot generate sufficient flux $\Phi_m$ to drive the motor.

In addition, at low frequencies, motor slip increases so that, actual motor speed is often less than the desired speed. Thus, for a motor to operate as desired at low frequencies, first, the magnetizing flux $\Phi_m$ must be adjusted to account for the increased stator resistive drop $R_s I_s$. Second, the driving frequency must be altered to compensate for increased slip.

A. Flux Compensation

Referring to FIG. 2, the current $I_s$ is supplied to the motor phase and divides between the rotor resistor $R_s$ and magnetizing inductor $L_m$. Because the magnetizing flux $\Phi_m$ is proportional to the magnetizing current $I_{mag}$ within a certain range, the flux $\Phi_m$ can be maintained within a desired range if the magnetizing current $I_{mag}$ can be maintained within a corresponding desired range. Thus, first a desired corresponding magnetizing current range must be determined and then, an approximate magnetizing current value must be derived for comparison and correction purposes.

The desired current range covers current values that are approximately equal to an optimal current value. It has been determined that, while an optimal magnetizing flux and corresponding magnetizing current exist, a motor will operate if the flux and current are approximately optimal. Thus, in some cases if the actual magnetizing current is within ±20 percent of the optimal magnetizing current, flux will be sufficient and the motor will operate. In nearly all cases, if the actual current is within ±10 percent of the optimal current, the motor will operate. The preferred range is within ±5% of the optimal magnetizing current.

Each motor has a rated voltage $V_{rate}$ at which the stator voltage should be maintained when the motor is driven at a nameplate or rated frequency $f_{rate}$ with no load. The rated voltage $V_{rate}$ is calculated so that, at the rated frequency $f_{rate}$, the rated voltage $V_{rate}$ generates an optimal magnetizing flux level.

Referring again to FIG. 2, because the affective rotor resistance $R_r$ is equal to the real rotor resistance $r_r$ divided by the slip s, and because the slip s is very small when the motor is driven with no load, during no load excitation, the affective rotor resistance $R_r$ is extremely high. High rotor resistance $R_r$ minimizes rotor current $I_r$ and therefore, during no load excitation, nearly all stator current $I_s$ flows through inductor $L_m$ so that the magnetizing current $I_{mag}$ is nearly equal to the stator current $I_s$. Thus, during a calibration period, by measuring the stator current while driving the motor at the rated frequency $f_{rate}$ and with the rated voltage $V_{rate}$ with no load, an optimal magnetizing current Iomag can be measured.

After determining the optimal magnetizing current $I_{omag}$ during the calibration period, the driver can be programmed with any suitable desired magnetizing current range near the optimal value. While the current range could be within ±20% of the $I_{omag}$, to ensure proper motor operation, preferably, the range is ±5% of the optimal magnetizing current $I_{omag}$. After the driver is programmed with the magnetizing current range, the driver must be programmed to assess actual magnetizing current $I_{mag}$ during loaded motor operation.

Figure 3:
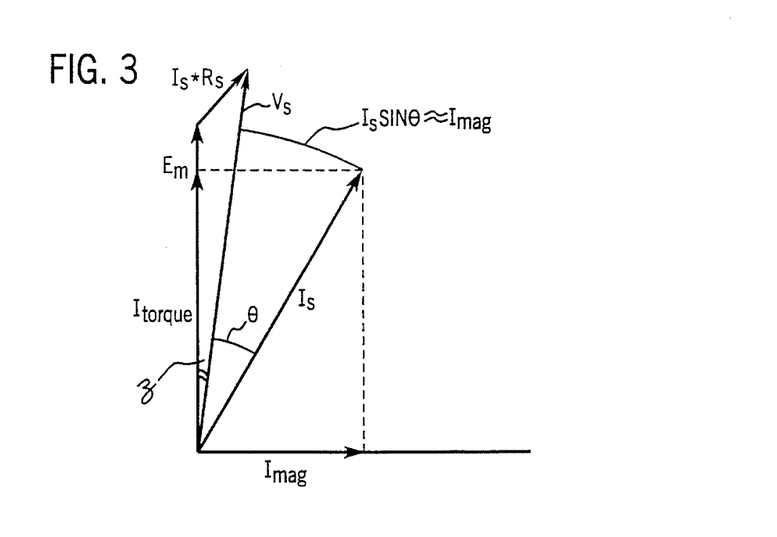
FIG. 3 is a phasor diagram showing the relationship between stator voltage, stator current, magnetizing current, and other motor parameters.

FIG. 3 is a phaser diagram which relates to the equivalent circuit shown in FIG. 2 and depicts the relationship between stator voltage $V_s$ and current $I_s$ as well as other motor parameters of interest during loaded motor operation. In FIG. 3 the stator voltage $V_s$ leads the current $I_s$ by phase angle θ.

The stator voltage $V_s$ includes both the magnetizing potential $E_m$ as well as the stator resistive drop $I_s R_s$. It can be seen that when the resistive drop $I_s R_s$ increases, the magnetizing potential $E_m$ must decrease given a specific stator voltage $V_s$. The stator current $I_s$ includes both a torque producing component $I_{torque}$ and the magnetizing component $I_{mag}$ which is the parameter of interest. The stator voltage $V_s$ lags the magnetizing potential $E_m$ by an angle ζ which becomes relatively small at low frequencies. Because the angle ζ decreases at low frequencies, a good approximation of the magnetizing current $I_{mag}$ can be determined according to Equation 3.

The stator voltage $V_s$ is provided by the driver and therefore its instantaneous value is known. The V/F drive monitors the stator current $I_s$. By subtracting the zero crossing time of the stator voltage $V_s$ from the following consecutive zero crossing time of the stator current $I_s$ and converting the resulting period to degrees, the phase angle θ can be determined. Then, Equation 3 can be used to find a good approximation of the magnetizing current $I_{mag}$.

The current approximation $I_{mag}$ can then be compared to the acceptable magnetizing current range and, where the current approximation $I_{mag}$ is not within the acceptable range, the stator voltage $V_s$ can be adjusted to alter the stator current $I_s$ and thus provide the correct magnetizing current $I_{mag}$.

Clearly, there are some limitations on how much the stator voltage $V_s$ can be increased or boosted prior to risking motor component damage. The most important limitation is the level of stator current $I_s$ which, when excessive for a prolonged period, will cause component damage or destruction. Therefore, the booster 20 should monitor the stator current $I_s$ and limit $I_s$ where its cause is on going. Excessive stator current can be caused by either excessive stator voltage (e.g. in the present case an excessive voltage boost $V_b$) or an instantaneously high load. Referring again to FIG. 2, where motor load increases, the slip s also increases causing the effective rotor resistance $R_r$ to decrease, so that the total resistance looking into the equivalent circuit is reduced and thus the stator current $I_s$ instantaneously increases. For protection purposes, the stator current $I_s$ should not be reduced when the load is instantaneously increased but should be reduced when the excessive current is caused by the level of the boost $V_b$ and is therefore ongoing. For the purposes of this explanation, when excessive stator current is caused by an increased load, the excessive current will be referred to as a load generated current.

Thus, when excessive stator current $I_s$ is identified, the V/F boost 20 must determine the cause of the excessive current (i.e. if the current is a load generated current) prior to determining if and how the voltage boost $V_b$ should be altered. To determine when an excessive stator current $I_s$ is a load generated current, the V/F boost 20 must compare various other motor parameters which are also indicative of load generated current. Specifically, the V/F boost $f_r$ 20 compares the voltage boost $V_b$ itself, the phase angle $\theta$, and the magnetizing current estimate $I_{mag}$ to maximum corresponding values. The maximum stator current $I_s$ should be held below some multiple of the rated current Irate.

Figure 1:
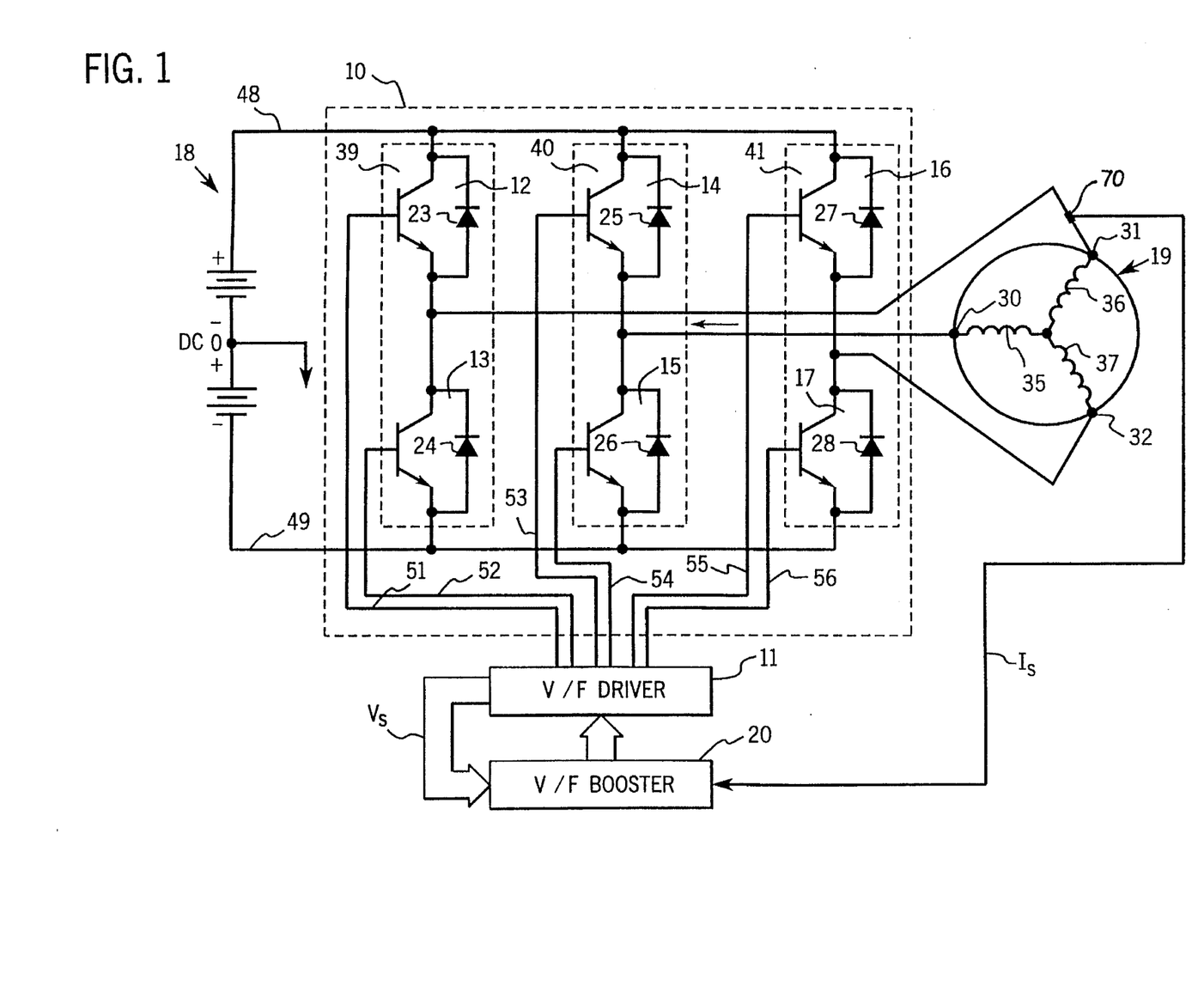
FIG. 1 is a schematic diagram of a motor controller according to the present invention.
Figure 5:
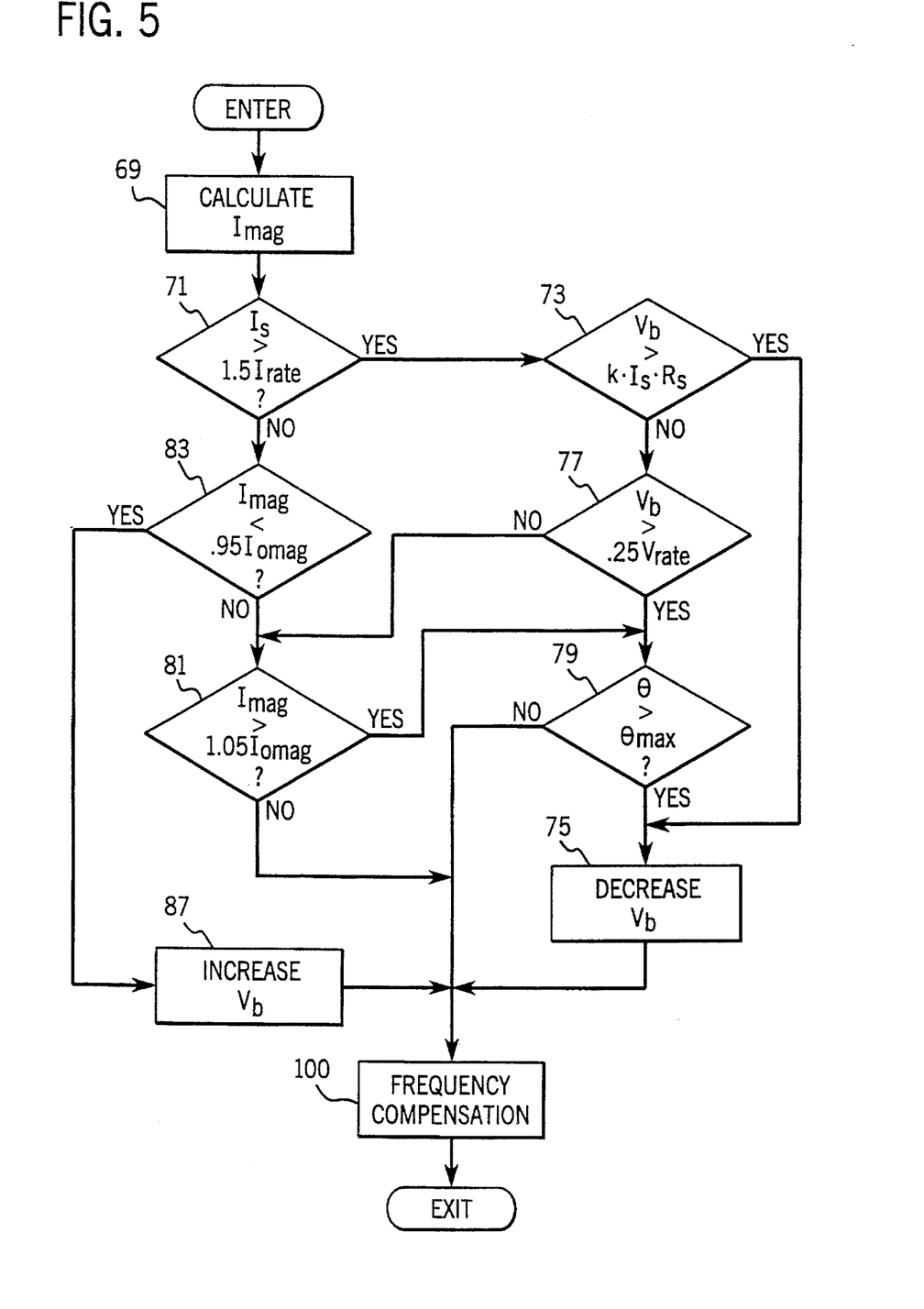
FIG. 5 is a flow chart indicating operation of the V/F booster of FIG. 1.
Figure 6:
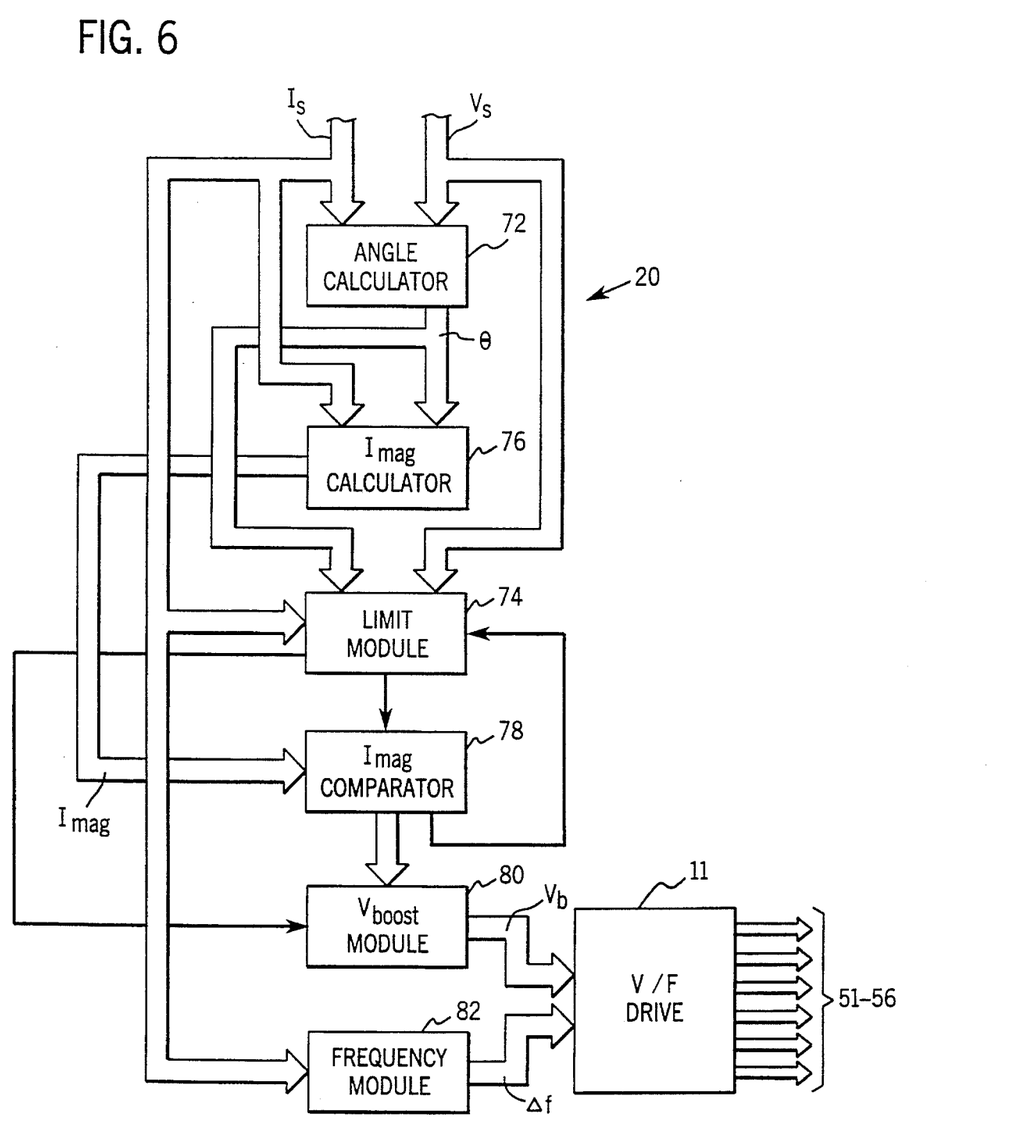
FIG. 6 is a block diagram of the V/F booster in FIG. 1.

Referring now to FIGS. 5 and 6, FIG. 5 shows a flow chart of how the V/F booster 20 shown in FIG. 1 works while FIG. 6 shows a block diagram of a preferred V/F booster 20. The V/F booster 20 includes an angles calculator 72, a limit module 74, a magnetizing current calculator 76, a magnetizing current comparator 78, a voltage boost module 80 and a frequency module 82. Referring also to FIG. 1, a current transformer 70 or other suitable current sensing means provides a stator current signal $I_s$ to the V/F booster 20 while the V/F driver 11 provides a stator voltage $V_s$ signal indicating the stator voltage. Both the stator voltage $V_s$ and stator current $I_s$ signals are provided to an angle calculator 72. As well known in the art, the angle calculator 72 may include zero crossing detectors which determine a voltage signal zero crossing and a following consecutive current signal zero crossing and a zero crossing comparator (not shown) which subtracts the current zero crossing from the voltage zero crossing to provide a phase angle period. The angle calculator also includes a converter (not shown), which is also well known, to convert the phase angle period to a phase angle $\theta$ in degrees. The phase angle $\theta$ is provided to current calculator 76. The current calculator 76 calculates the approximate magnetizing current $I_{mag}$ at block 69 according to Equation 3 and supplies the approximation to the magnetizing comparator 78.

Referring still to FIGS. 5 and 6, the limit module 74 receives the stator voltage $V_s$, and stator current $I_s$ signals as well as the phase angle $\theta$.

Preferably, the limit module 74 compares the stator current signal $I_s$ to 1.5 times the rated current value $I_{rate}$ at block 71 to determine if the stator current is at an excessive level. The 1.5 ratio was chosen arbitrarily from within a range of 1.2 to 3.0 and clearly other suitable ratios are contemplated.

Where the stator current is greater than 1.5 times the rated current $I_{rate}$, the stator current is excessive. At this point, the limit module 74 checks various other motor parameters to assess if the stator current is excessive because of the stator voltage $V_s$ level or because of a large instantaneous load. To this end, the limit module 74 checks if the immediate voltage boost $V_b$ is greater than the stator resistance drop $KI_sR_s$ at block 73. Where the voltage boost $V_b$ is greater than the stator resistive drop $KI_sR_s$, the limit module 74 instructs the voltage boost module 80 to decrease the voltage boost $V_b$ at block 75. This decrease reflects the fact that a voltage boost that is greater than the stator resistive drop indicates that the excessive stator current $I_s$ is not a load generated current. Where the voltage boost $V_b$ is less than the stator resistive drop $KI_sR_s$, the limit module 74 checks if the boost $V_b$ is greater than 25% of the rated voltage $V_{rate}$ at block 77.

Where the voltage boost $V_b$ is greater than 25% of the rated voltage $V_{rate}$, the limit module 74 determines if the phase angle $\theta$ is greater than the maximum phase angle $\theta_{max}$ at block 79. Preferably $\theta_{max}$ is 50%. Where the phase angle $\theta$ is greater than the maximum phase angle $\theta_{max}$ and the voltage boost $V_b$ is greater than 25% of the rated voltage $V_{rate}$, it is likely that the excessive stator current $I_s$ is due primarily to excessive stator voltage $V_s$ and is not a load generated current. Thus, where the phase angle is greater than the maximum phase angle $\theta_{max}$, the limit module 74 instructs the voltage boost module 80 to decrease the voltage boost $V_b$ at block 75.

Referring still to FIGS. 5 and 6, where the phase angle $\theta$ is less than the maximum phase angle $\theta_{max}$, the excessive stator current is a load generated current and therefore, the voltage boost $V_b$ is not altered.

At block 77, where the voltage boost $V_b$ is not greater than 25% of the rated voltage $V_{rate}$, it is likely that the boost $V_b$ is not causing the excessive stator current $I_s$. Nevertheless, in this case, regardless of the cause of excessive stator current $I_s$, it is desirable to reduce the stator current if the reduction can be accomplished while maintaining the magnetizing current $I_{mag}$ within the acceptable magnetizing current range. To this end, the limit module 74 instructs the current comparator 78 to determine if the magnetizing current estimate $I_{mag}$ is less than the maximum acceptable current level in the acceptable current range. Thus, at block 81 the comparator 78 checks if the magnetizing current estimate $I_{mag}$ is greater than 105% of the optimal magnetizing current $I_{omag}$ and, where it is not greater, the comparator 78 indicates to the boost module 80 that the boost should not be altered. However, where the magnetizing current estimate $I_{mag}$ is greater than 105% of the optimal current $I_{omag}$, the comparator 78 directs the limit module 74 to compare the phase angle $\theta$ to the maximum phase angle $\theta_{max}$ at 79. At this point, as explained above, the limit module 74 determines, based on the phase angle $\theta$, if the boost $V_b$ should be decreased or should remain unchanged.

Where the stator current $I_s$ is less than 1.5 times the rated current $I_{rate}$ at block 71, the voltage boost $V_b$ can be either adjusted downwardly or upwardly to drive the magnetizing current $I_{mag}$ into the acceptable range. Thus, the limit module 74 passes control to the comparator 78 which compares the magnetizing current estimate $I_{mag}$ to the acceptable range at blocks 83 and 81. Where the magnetizing current $I_{mag}$ is in the acceptable range the comparator 78 instructs the boost module 80 to maintain the instantaneous level of the voltage boost $V_b$. Where the magnetizing current $I_{mag}$ is below the acceptable range (i.e. below 0.95 $I_{omag}$) at block 83, the comparator 78 instructs the boost module 80 to increase the boost $V_b$ at block 87. And where the magnetizing current is above the acceptable range (i.e. above 1.05 $I_{omag}$), the comparator 78 instructs the limit module 74 to do a phase angle check at block 79.

Any changes to the voltage boost $V_b$ are reflected in the firing signals produced by the V/F driver on lines 51–56 thus altering stator voltage $V_s$ and magnetizing current $I_{mag}$ accordingly. The voltage boost $V_b$ is continually altered during low frequency motor operation so that, through small incremental changes, the boost $V_b$ maintains the required and acceptable magnetizing current range. Thus, the V/F booster 20 alters the level of the voltage boost $V_b$ in a manner that maintains the magnetizing current $I_{mag}$ in the acceptable range.

The boost is accomplished without increasing the stator current $I_s$ to dangerous levels for prolonged periods and in a manner that identifies magnetizing current increases due to instantaneous load fluctuations and suppresses boost changes when excessive stator current results from load fluctuations.

B. Frequency Compensation

Referring again to FIG. 2, while typical V/F drive operates to maintain the relationships expressed in Equation 2 above, the present drive operates to maintain a relationship between the magnetizing potential $E_m$ and the driving frequency $f_s$ which will ensure sufficient magnetizing flux $\theta_m$ even at relatively low frequencies. Thus, where the inventive driver commands an output frequency $f_{out}$, the driver should produce an output magnetizing potential $E_{out}$ such that:

$$\frac{E_{rate}}{E_{out}} = \frac{f_{rate}}{f_{out}} \qquad (4)$$

where $E_{rate}$ is the magnetizing potential across inductor $L_m$ when the motor is driven at the rated frequency $f_{rate}$ with the rated voltage $V_{rate}$ and with load.

Unfortunately, it is difficult to maintain the relationships expressed in Equation 4 because the output magnetizing potential $E_{out}$ is affected by the output frequency $f_{out}$ and visa versa. In addition, both the output potential $E_{out}$ and frequency $f_{out}$ are affected by the actual motor slip $s_{out}$ via a changing torque where the slip changes as a function of load.

An expression for actual motor slip $s_{out}$ can be derived by examining motor torque T as a function of slip. Given a real rotor resistance $r_r$, a resulting motor torque T can be expressed as:

$$T = I_r^2 \cdot \frac{r_r}{s} \cdot \frac{1}{2\pi f} \qquad (5)$$

Referring to FIG. 2, the rotor current $$I_r = \frac{E \cdot s}{r_r}$$

and therefore, Equation 5 can be expressed as:

$$T = \frac{E^2 \cdot s}{r_r} \cdot \frac{1}{2\pi f} \qquad (6)$$

Hence, rated torque $T_{rate}$ and an actual output torque $T_{out}$ which is less than $T_{rate}$ can be expressed as:

$$T_{rate} = \frac{E_{rate}^2}{r_r} \cdot \frac{s_{rate}}{2\pi f_{rate}} \qquad (7)$$

and;

$$T_{out} = \frac{E_{out}^2}{r_r} \cdot \frac{s_{out}}{2\pi f_{out}} \qquad (8)$$

respectively. Where it is desired to have the output torque $T_{out}$ equal the rated torque $T_{rate}$, the rated torque $T_{rate}$ from Equation 7 should equal the output torque $T_{out}$ from Equation 8 and thus, combining Equations 7 and 8:

$$s_{out} = \left( \frac{E_{rate}^2}{E_{out}^2} \cdot \frac{f_{out}}{f_{rate}} \right) \cdot s_{rate} \qquad (9)$$

Combining Equations 4 and 9 and simplifying:

$$s_{out} = \frac{f_{rate}}{f_{out}} \cdot s_{rate} \qquad (10)$$

Thus, the slip $s_{out}$ at an output frequency $f_{out}$ can be determined by Equation 10.

Where a motor operates at the rated torque $T_{rate}$ and no slip occurs, the motor speed $RPM_d$ can be expressed as:

$$RPM_d = \frac{60 f_{cmd}}{pp} \qquad (11)$$

where pp is the number of motor pole pairs and $f_{cmd}$ is the command frequency required to achieve the desired speed $RPM_d$ with no slip. In reality, however, slip does occur and therefore the motor speed is less than would be expected. The actual motor speed $RPM_a$ given an actual output slip $s_{out}$ is:

$$RPM_a = \frac{60 f_{out}}{pp} (1 - s_{out}) \qquad (12)$$

Combining Equations 10 and 12, the actual motor speed $RPM_a$ can be expressed as:

$$RPM_a = \frac{60 f_{out}}{pp} \left( 1 - \frac{f_{rate}}{f_{out}} \cdot s_{rate} \right) \qquad (13)$$

Assuming the desired motor speed is $RPM_d$ and that, given the actual output slip $s_{out}$ the actual frequency $f_{out}$ drives the motor at actual speed $RPM_a$, the difference in frequency required to achieve the desired speed $RPM_d$ can be determined by setting $RPM_d$ equal to $RPM_a$ and solving for $f_{out}-f_{cmd}$. Setting $RPM_d=RPM_a$ and solving for $f_{out}-f_{cmd}$:

$$\Delta f_1 = f_{out} - f_{cmd} = f_{rate} \cdot s_{rate} \qquad (14)$$

Hence, where the motor includes a load, the stator voltage frequency $f_s$ should by altered by $\Delta f_1$ as determined using Equation 14 to account for motor slip.

Where the load changes during motor operation, another frequency change $\Delta f_2$ is required to maintain a desired speed $RPM_d$. When load changes, the motor torque T also changes and therefore, a different actual output slip $s_{out2}$ results. Through experimentation, it has been determined that the actual slip $s_{out2}$ is related to stator current $I_s$ and rated motor values such $$s_{out2} = \left( \frac{I_s^2}{I_{rate}^2} \right) \cdot s_{rate} \qquad (15)$$

where $I_{rate}$ is the rated stator current. Again, because the object is to maintain a constant speed $RPM_d$, when the load changes so that the $S_{out2}$ output slip is altered, the stator voltage frequency $f_s$ must also be altered in order to maintain constant speed $RPM_d$. Thus, we want the speed in RPMs due to the rated frequency $f_{rate}$ plus the frequency compensation $\Delta f_2$ with the actual slip $s_{out2}$ to equal motor speed at the rated frequency $f_{rate}$ with the rated slip $s_{rate}$. Thus:

$$(1 - s_{rate}) f_{rate} = (1 - s_{out2})(f_{rate} + \Delta f_2) \qquad (16)$$

combining Equations 15 and 16 and simplifying:

$$\Delta f_2 = \frac{(I_s^2 - I_{srate}^2) s_{rate}}{I_{srate}^2 - s_{rate} \cdot I_s^2} \cdot f_{rate} \qquad (17)$$

Total frequency compensation Δf accounting for an initial load and a changing load is then $\Delta f_1 + \Delta f_2$ so that:

$$\Delta f = f_{rate} \cdot s_{rate} \left[ 1 + \frac{I_s^2 - I_{srate}^2}{I_{srate}^2 - s_{rate} \cdot I_s^2} \right] \qquad (18)$$

Referring again to FIGS. 1, 5 and 6, while the V/F booster 20 is adjusting the voltage boost $V_b$ to control the magnetizing current $I_{mag}$, the booster 20 is also adjusting the stator voltage frequency $f_s$ via the frequency module 82 at block 100 where the frequency module 82 uses rated slip, frequency, and current values in addition to the sensed stator current $I_s$ to determine Δf according to Equation 18 above. The frequency module 82 provides Δf to the V/F drive 11 which adjusts the firing signals on lines 51–56 accordingly.

Thus, a simple, reliable, and cost effective apparatus and method have been described which can be used with a voltage/frequency motor driver to maintain a motor driving magnetizing flux $\Phi_m$ within a desired range and to drive a motor at a desired speed despite low frequency motor operation. The inventive method and apparatus take advantage a single sensed signal, the stator current $I_s$, to control both the motor driver frequency and the magnetizing flux at low frequencies. Thus, no hardware in addition to the hardware provided with a typical voltage/frequency driver is required.

While specific embodiments have been described above, it should be understood that the present invention contemplates various changes that would be obvious to one of ordinary skill in the art. For example, while the phase angle θ is required to determine the magnetizing current estimate $I_{mag}$ and one method for determining the phase angle θ has been disclosed, any method of determining the phase angle could be used. In addition, while various limitations have been placed on the stator current level, the voltage boost level, the magnetizing current level and the phase angle, other suitable limitations could be used. For example, where the limit module 74 compares the boost $V_b$ to 0.25 $V_{rate}$ at block 77, $V_b$ could have been compared to some other fraction of $V_{rate}$ (i.e. 0.10 to 0.50 $V_{rate}$). Similarly, $\theta_{max}$ could range from 10° to 70°. In order to apprise the public of the various embodiments that may fall within the scope of the invention, the following claims are made.

I claim:

1. A method to be used with a motor controller for controlling magnetizing flux between a motor stator and a rotor, the flux being proportional to a magnetizing current, the controller providing a stator current signal and a related stator voltage signal which is indicative of the stator voltage provided by the controller, the method comprising the steps of:

(a) determining an acceptable magnetizing current range in which the magnetizing current generates enough magnetizing flux to drive the motor;

(b) deriving a current phase angle;

(c) combining the phase angle and the stator current to produce a magnetizing current estimate;

(d) comparing the magnetizing current estimate to the acceptable magnetizing current range; and (e) where the magnetizing current estimate is outside the acceptable magnetizing current range, adding a voltage boost to the stator voltage having a polarity tending to drive the magnetizing current to a level within the acceptable current range.

2. The method of claim 1 wherein the motor is characterized by a rated voltage when the motor is driven at a rated frequency with no load and the step of determining an acceptable magnetizing current range includes the steps of, while running the motor at the rated frequency and voltage with no load, monitoring the stator current and setting the acceptable magnetizing current range between 80 percent and 120 percent of the monitored stator current.

3. The method of claim 2 wherein the step of setting the range includes setting the range between 95 percent and 105 percent of the monitored stator current.

4. The method of claim 1 wherein the step of deriving a current phase angle includes the steps of comparing a zero crossing of the stator voltage signal with a following and consecutive zero crossing of the stator current signal to provide a phase angle period and converting the phase angle period to degrees.

5. The method of claim 1 wherein the step of combining includes the steps of multiplying the sine of the phase angle by the stator current signal.

6. The method of claim 1 wherein the motor is characterized by a safe maximum stator current, and the method further includes the steps of, prior to adding the voltage boost, determining if the stator current is greater than a maximum stator current and is therefore an excessive stator current and, if the stator current is the excessive stator current, determining if the excessive stator current is caused by a load fluctuation and is therefore a load generated current and:

if the excessive stator current is not the load generated current, decreasing the voltage boost and skipping to step b; and if the excessive stator current is the load generated current, skipping to step b.

7. The method of claim 6 wherein the motor stator is characterized by a stator resistance which causes a stator resistive drop and the controller provides a maximum phase angle signal and a maximum boost level and the acceptable magnetizing current range is characterized by an acceptable maximum current level, the step of determining if the excessive stator current is the load generated current includes the steps of:

determining if the voltage boost is greater than the stator resistive drop and:

(A) if the voltage boost is greater than the stator resistive drop, concluding that the excessive stator current is not the load generated current; and (B) if the voltage boost is less than the stator resistive drop, determining if the voltage boost is greater than the maximum boost level, and:

(i) if the voltage boost is greater than the maximum boost level:

(1) determining if the phase angle is greater than the maximum phase angle signal and, if the phase angle is less than the maximum phase angle signal, concluding that the excessive stator current is the load generated current, if the phase angle is greater than the maximum phase angle signal, concluding that the excessive stator current is not the load generated current; and (ii) if the voltage boost is less than the maximum boost level:

(i) determining if the magnetizing current estimate is greater than the maximum acceptable current level and, if the magnetizing current estimate is less than the maximum acceptable current level, concluding that the excessive stator current is not the load generated current, if the magnetizing current estimate is greater than the maximum acceptable current level, skipping to step (B) (i) (1) above.

8. The method of claim 6 wherein the motor is characterized by a rated current and the safe maximum stator current is 1.5 times the rated current.

9. The method of claim 7 wherein the maximum voltage boost is 0.25 times the rated voltage.

10. The method of claim 7 wherein the maximum phase angle signal indicates a maximum phase angle of 50 degrees.

11. The method of claim 1 wherein the controller provides the stator voltage at a driver frequency and the method is also used for adjusting the driver frequency as a function of actual slip to maintain a constant motor speed despite variations in load, the controller also providing rated current, rated slip, and rated frequency values, the method further including the steps of, prior to step f, combining the stator current, the rated frequency, the rated slip, and the rated current to derive a frequency modifier value and adding the frequency modifier value to the driver frequency to compensate for actual slip.

12. The method of claim 11 wherein the stator current, rated frequency, rated slip, and rated current are combined according to the equation:

$$\Delta f = f_{rate} \cdot s_{rate} \left[ 1 + \frac{I_s^2 - I_{srate}^2}{I_{srate}^2 - s_{rate} \cdot I_s^2} \right]$$

where $f_{rate}$ is the rated frequency, $s_{rate}$ is the rated slip, $I_{rate}$ is the rated current, and $I_s$ is the stator current.

13. An apparatus to be used with a motor controller for controlling magnetizing flux between a motor stator and a rotor, the flux being proportional to magnetizing current, the controller providing a stator current signal and a related stator voltage signal which is indicative of the stator voltage provided by the controller, the apparatus comprising:

(a) a range calculator for determining an acceptable magnetizing current range in which the magnetizing current generates enough magnetizing flux to drive the motor;

(b) an angle calculator for deriving a current phase angle;

(c) a current calculator for combining the phase angle and the stator current to produce a magnetizing current estimate;

(d) a current comparator for comparing the magnetizing current estimate to the acceptable magnetizing current range; and (e) a voltage boost module for, where the magnetizing current estimate is outside the acceptable magnetizing current range, adding a voltage boost to the stator voltage, the polarity of said voltage boost calculated to drive the magnetizing current to a level within the acceptable current range.

14. The apparatus of claim 11 wherein the motor is characterized by a rated voltage when the motor is driven at a rated frequency with no load and the range calculator includes a current sensor to monitor the stator current while the controller drives the motor at the rated frequency and rated voltage with no load, and a range setter that sets the acceptable magnetizing current range between 80 percent and 120 percent of the monitored stator current.

15. The apparatus of claim 14 wherein the range setter sets the range between 95 percent and 105 percent of the monitored stator current.

16. The apparatus of claim 13 wherein the current estimator includes a multiplier for multiplying the sine of the phase angle by the stator current signal to produce the magnetizing current estimate.

17. The apparatus of claim 13 wherein the motor is characterized by a safe maximum stator current, and the apparatus further includes a limit module that, prior to adding the voltage boost, determines if the stator current is greater than a maximum stator current and is therefore an excessive stator current and, if the stator current is an excessive stator current, determines if the excessive stator current is caused by a load fluctuation and is therefore a load generated current and, if the excessive stator current is not the load generated current, directs the voltage boost module to add a voltage boost having a polarity which will reduce the stator current and, if the excessive stator current is the load generated current, returns control to the angle calculator.

18. The apparatus of claim 13 wherein the controller provides the stator voltage at a driver frequency and the method is also used for adjusting the driver frequency as a function of actual slip to maintain a constant motor speed despite variations in load, the controller also providing rated current, rated slip, and rated frequency values, the apparatus further including a frequency module that generates a frequency modifier value by combining the stator current, the rated frequency, the rated slip, and the rated current and adds the frequency modifier value to the driver frequency to compensate for actual slip.

19. The apparatus of claim 18 wherein the stator current, rated frequency, rated slip, and rated current are combined according to the equation:

$$\Delta f = f_{rate} \cdot s_{rate} \left[ 1 + \frac{I_s^2 - I_{srate}^2}{I_{srate}^2 - s_{rate} \cdot I_s^2} \right]$$

where $f_{rate}$ is the rated frequency, $s_{rate}$ is the rated slip, $I_{rate}$ is the rated current, and $I_s$ is the stator current.

20. A method to be used with a motor controller, the controller providing a stator voltage to the motor at a driver frequency, the method for controlling magnetizing flux between a motor stator and a rotor and for adjusting the frequency of a stator voltage to provide a desired motor speed despite a motor slip, the controller providing a stator current signal and a related stator voltage signal which is indicative of the stator voltage, the magnetizing flux being proportional to magnetizing current, the controller also providing rated current, rated slip, rated frequency, and rated voltage values characteristic of the motor, the method comprising the steps of:

(a) during a calibration period, while running the motor at the rated frequency and voltage with no load, monitoring the stator current and setting an acceptable magnetizing current range between 80 percent and 120 percent of the monitored stator current, (b) after the calibration period, combining the stator current signal, the rated frequency, the rated slip, and the rated current to provide a frequency modifier value;

(c) adding the frequency modifier value to the driver frequency;

(d) comparing a zero crossing of the stator voltage signal with a following and consecutive zero crossing of the stator current signal to provide a phase angle period;

(e) converting the phase angle period to degrees;

(f) multiplying the sine of the phase angle by the stator current signal to produce a magnetizing current estimate, (g) comparing the magnetizing current estimate to the acceptable magnetizing current range; and (h) where the magnetizing current estimate is outside the acceptable magnetizing current range, adding a voltage boost to the stator voltage having a polarity tending to drive the magnetizing current to a level within the acceptable current range.

21. The method of claim 20 wherein the step of setting the range includes setting the range between 95 percent and 105 percent of the monitored stator current.

22. The method of claim 20 wherein the stator current signal, rated frequency, rated slip, and rated current are combined according to the equation:

$$\Delta f = f_{rate} \cdot s_{rate} \left[ 1 + \frac{I_s^2 - I_{srate}^2}{I_{srate}^2 - s_{rate} \cdot I_s^2} \right]$$

where $f_{rate}$ is the rated frequency, $s_{rate}$ is the rated slip, $I_{rate}$ is the rated current, and $I_s$ is the stator current.

* * * * *